US011840453B2

(12) United States Patent
Vlassoff et al.

(10) Patent No.: US 11,840,453 B2
(45) Date of Patent: Dec. 12, 2023

(54) PROTECTING VALVE PARTS FROM EROSION

(71) Applicant: Dresser, LLC, Houston, TX (US)

(72) Inventors: Cyril Nicolas Vlassoff, Conde-sur-Noireau (FR); Chad Eric Yates, Houston, TX (US); Gheorghe Dodan, Saint Johns, FL (US); Mikhail Anisimov, Houston, TX (US); Wei Chen, Sugar Land, TX (US); Alexandre Serra Cachinhasky, Houston, TX (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/549,228

(22) Filed: Dec. 13, 2021

(65) Prior Publication Data

US 2022/0185678 A1 Jun. 16, 2022

(51) Int. Cl.
*F16K 25/00* (2006.01)
*F16K 25/04* (2006.01)
*C01B 32/949* (2017.01)
*F16K 5/08* (2006.01)

(52) U.S. Cl.
CPC .............. *C01B 32/949* (2017.08); *F16K 5/08* (2013.01); *F16K 25/005* (2013.01); *F16K 25/04* (2013.01)

(58) Field of Classification Search
CPC .......... F16K 5/08; F16K 25/005; F16K 25/04; C01B 32/949; C23C 28/044; C23C 28/048; C23C 28/028
See application file for complete search history.

(56) References Cited

U.S. PATENT DOCUMENTS

2020/0248819 A1    8/2020    Stadlberger et al.

FOREIGN PATENT DOCUMENTS

| CN | 203697597 U | 7/2014 | |
|----|-------------|--------|---|
| CN | 212107099 A | 12/2020 | |
| JP | 01-172683 A | 7/1989 | |
| JP | 2021172873 A | * 11/2021 | ........... C23C 14/025 |

(Continued)

OTHER PUBLICATIONS

PCT Search report and written opinion dated Apr. 12, 2022.

(Continued)

*Primary Examiner* — Marina A Tietjen
(74) *Attorney, Agent, or Firm* — Paul Frank + Collins P.C.

(57) ABSTRACT

A coating that is configured for use on parts of a control valve. The configurations may incorporate various material layers, preferably that form a layered structure on a base or substrate (for example, an Inconel body). In one implementation, the layered structure can be arranged as "stacked" individual layers that exhibit different concentrations or ratios of materials, including by example tungsten carbide and nickel alloy. The concentration of tungsten carbide may increase from an innermost layer to an outer most layer. This feature can extend service life of the parts, particularly when in use with highly-erosive process fluids, like particle-entrained fluids commonly found in hydrocracking or refining operations. Manufacture of the layered structure on the parts may require use of additive manufacturing technology in order to deposit layers of material of varying composition and thickness on the unique fluted design contemplated herein.

20 Claims, 4 Drawing Sheets

(56) References Cited

FOREIGN PATENT DOCUMENTS

| KR | 102100280 B1 * | 4/2020 | |
|---|---|---|---|
| WO | WO-2018175381 A1 * | 9/2018 | ........... C23C 28/046 |
| WO | WO-2021099873 A1 * | 5/2021 | ............. C23C 28/32 |

OTHER PUBLICATIONS

Product instruction manual, "Masoneilan 74000 Series Erosion Resistant Control Valves Instruction Manual (Rev. A)," (2018).
Product manual, "Masoneliean 74000 Series Erosion Resistant Control Valves," (2020).
Amado et al.' Ni-based metal matrix composite functionally graded coatings, Physics Prodedia 39, p. 362-267, (2012).
Duram Verschleiss-Schutz GMBH, "Durmat(R) FTC Powders".
Durum Verschleiss-Schutz GMBH, "Advanced Wear Protecion with Fused Tungsten Carbide Products," (2017).

* cited by examiner

PROTECTING VALVE PARTS FROM EROSION

CROSS-REFERENCE TO RELATED APPLICATIONS

This application claims the benefit of French Provisional Patent Application Serial No. 2013376, filed on Dec. 16, 2020, and entitled LASER MELTING DEPOSITION FOR USE WITH VALVE PLUG. The content of this application is incorporated herein in its entirety.

BACKGROUND

Flow controls play a large role in many industrial facilities. Power plants and industrial process facilities, for example, use different types of flow controls to manage flow of a material, typically fluids, throughout vast networks of pipes, tanks, generators, and other equipment. Control valves are useful to accurately regulate flow to meet process parameters. These devices can provide control over flow rate, pressure, and temperature of the material. In oil and gas industry, operators may deploy control valves to control flow of debris-entrained fluids in hydrocracking or related processes.

Fluids in these processes are known to be highly-erosive. The materials may cause parts of the valve found directly in the flow to degrade rapidly. Use of entrained solids, such as coke, coal fines, or catalysts, within the process fluid may inhibit valve throttling, reduce total flow capacity, and potentially clog valves. Large pressure reductions of this complex fluid may produce outgassing, where three-phase flow (e.g., solid, liquid, and vapor) co-exist simultaneously. The pressure reduction and resulting fluid expansion phase change may increase solid particle velocity within the fluid. These particles may act as a high-intensity "sand blaster" that erodes any surface within the flow path. Process parameters may intensify damage from these particles because temperatures, typically in the range of 400° C., tend to make materials even more susceptible to erosion, as well.

Other demanding process conditions may prevail as well. These conditions include vibrations, mechanical cycling (continuous throttling), and valve lift position. Thermal cycling can introduce alternating expansion and contraction loading. For parts with base materials and hardened coating materials with different expansion rates, thermal cycling can cause the coating or "overlay" to spall, flake, or generally separate from the base, exposing the base to the highly-erosive flow.

SUMMARY

The subject matter of this disclosure relates to improvements that can lengthen service life of parts that are subject to highly corrosive or erosive environments. Of particular interest are coatings that can protect an underlying part or component. The embodiments may deploy one or more layers of materials on surfaces that reside in flow of highly-erosive working fluids. In one implementation, materials that make up this "layered structure" may change in concentration or ratio, for example, as between an interface layer proximate the surface of the part to an outermost layer or surface of the layered structure. These changes may improve the bond between the coating and the part. This feature can decrease erosion from the working fluid and risks of cracks (or formation of like anomalies) due to thermal gradients or different coefficients of thermal expansion or contraction.

The coated parts may find use as parts of a control valve. Operators may require these coated parts to exhibit hardness levels above hardness of any entrained particles in working fluids that traverse their facility. These requirements may frustrate use of certain materials. For example, hardened martensitic stainless steel lacks corrosion resistance to survive working fluid in hydrocracking applications. Base-level austenitic stainless steels have the necessary corrosion resistance; but these materials are inherently too soft for mechanical loading seen in flow controls found in hydrocracking process lines. On the other hand, high-performance alloys or ceramics, like Inconel or solid tungsten carbide, appear to meet requirements for corrosion, hardness, or strength. But many of these types of materials are too brittle, or like other steels become too brittle as hardness increase, to survive under duress of the working fluid in hydrocracking applications. This weakness can lead to fracture under non-symmetrical mechanical loading, which may occur when particles or debris entrained in working fluid becomes caught between moving parts. Further, brittle materials often fail in response to vibration. These conditions may arise in high-pressure systems from a combination of pressure drops along the system and changes in direction of the high-velocity flow of working fluid.

The embodiments herein may also prove superior to conventional overlay techniques that are used to achieve desired hardness. These processes may apply a coating or "overlay" onto valve trim that is homogeneous in composition. This coating is often fairly thin, for example, in a range of about 0.002 inches to about 0.004 inches. This feature provides small margin of cover. Also, the processes may fail to account for thermal expansion of the coating and the underlying substrate. This oversight may lead to cracks in the overlay coating in response to thermal cycling consistent with start-and-stop operation of flow controls or like valve device. Surface cracks in the relatively shallow overlay may quickly result in localized loss of coating and, ultimately, lead the substrate to rapidly degrade in use. Operators would not typically have any indication of these problems, unfortunately, until the part undergoes catastrophic failure.

DRAWINGS

Reference is now made briefly to the accompanying drawings, in which.

Figure 1:
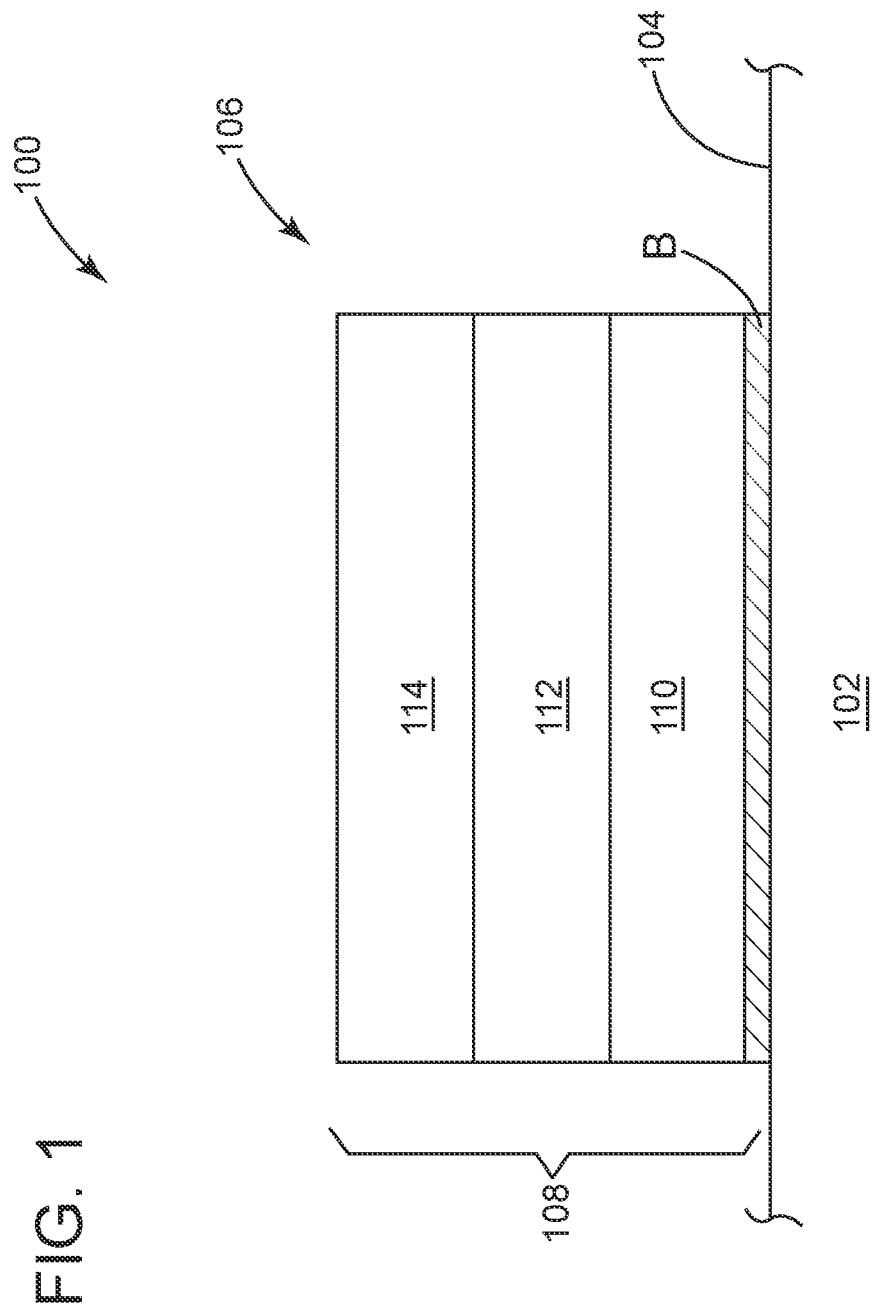
FIG. 1 depicts a schematic diagram of an exemplary embodiment of a coated part.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features

DESCRIPTION

The discussion now turns to describe features of the embodiments shown in the drawings noted above. These features improve upon solutions, including material combinations and part designs, that permeate various industries, including the hydrocarbon processing industry. This industry has newer processes that add hydrogen along with proprietary catalysts under higher pressure and temperature to increase conversion of hydrocarbon feedstock into commercially-valued products. Operators can leverage these operating characteristics to refine highly viscous hydrocarbons and tougher feedstocks, such as residuals from tank bottoms, into a higher-yield refined end product, like low sulfur mid-distillate. This favorable output improves cost ratio because the end products have relatively high market value for use in production of high-quality products. However, while these new processes improve outputs, they create very difficult environments for parts and other components to enjoy an adequate service life. The embodiments herein address this problem by way of a novel coating and manufacturing approach. Other embodiments are within the scope of this discussion.

FIG. 1 depicts a schematic diagram of the cross-section of an example of a coated part 100 for use in hydrocarbon industries, among others. This example includes a base 102 (also "substrate") with an exposed surface 104. A coating 106 may reside on the exposed surface 104. The coating 106 may have a layered structure 108 with one or more material layers, shown here as a first layer 110, a second layer 112, and a final or "top" layer 114. A buffer layer B may interpose between the first layer 110 and the exposed surface 104.

Broadly, the coated part 100 may be configured to withstand erosion and corrosion. These configurations may embody parts that find use in flow controls, like control valves. Conventional designs for these parts may wear rapidly in applications that use debris-entrained working fluids. Use of the coated part 100, on the other hand, may slow or even stop wear to extend service life because the part prevents damage that might lead to catastrophic failure and unplanned (and costly) outages on a process line. As a result, operators can avoid shortened operating life of its flow controls consistent with erosive flow that would otherwise saddle them with substantial labor and materials costs to undergo near-constant maintenance to replace the parts subject to these environments.

The base 102 may be configured as the part of a control valve. These configurations may embody a closure member, a seat, a cage, or the like, collectively or individual referred to as "valve trim", "valve trim assembly," or "trim kit." These parts may be machined or fabricated, for example, from a single piece of material. This construction results in a material composition that is homogenous or mostly homogenous throughout. The exposed surface 104 may assume any particular geometry. The seat or the cage, for example, may have a central opening with internal surface(s) that would benefit from protection because the working fluid passes through it. On the other hand, the closure member may embody a plug-like cylinder or a disc that resides in the opening of the cage. This device may move relative to the seat, for example, to contact the seat to stop flow of working fluid. Inconel is a popular choice for valve trim in many applications because of its propensity to support throttling and because its thermal expansion is consistent with materials that often make up other parts of valve trim (including the cage). However, other materials for these parts are contemplated within this disclosure.

The coating 106 may be configured to bond with the underlying material of the valve trim. These configurations may have structure to enhance erosion resistance. This structure may comprise metals and ceramics; in one implementation, the structure may include tungsten carbide, nickel alloy, stainless steel, or other materials or combinations thereof. Many of these materials may begin as powders or similar feedstocks that find use in generative metal producing technology or "additive" manufacturing processes. These processes are useful to build or layer material on complex geometries (for example, that may dictate features of the surface 104). In one implementation, additive processes may result in "graded" layering of the coating structure, for example, that causes each layer of the structure of the coating 106 to exhibit different properties, have different material compositions, or have different ratios of materials mixed together.

The layered structure 108 may be configured with this graded-layer approach. These configurations may have a composition that changes as between the layers 110, 112, 114. In one implementation, the concentration may exhibit a gradient (that may increase or decrease) from the bottom layer 110 to the top layer 114, and in some cases through each successive layer found therebetween. This gradient may define an increase in concentration of tungsten carbide or other materials. For example, the bottom layer 110 may have a first concentration of tungsten carbide, preferably one that ensures initial metallurgical bonding with the substrate 102 or with the buffer layer B, where applicable. The buffer layer B may comprise materials, like a high-nickel alloy, that prevent iron inclusion in the substrate 102. The intermediate layer 112 may have a second concentration of tungsten carbide that is higher than the first concentration of the bottom layer 110. The top layer 114 may have a third concentration that exceeds the concentrations of all the previous layers (e.g., layers 110, 112). This approach may result in a sufficiently high density of tungsten carbide (or other material) at the exposed, top layer 114 to prevent erosion of the substrate 102, as contemplated herein. In one implementation, the approach may create a high-concentration tungsten carbide coating with, for example, a 10×-significantly deeper, 0.040-inch, outer layer of wear resistance necessary to withstand erosion that occur in connection with applications that come in contact with highly-erosive materials.

Figure 2:
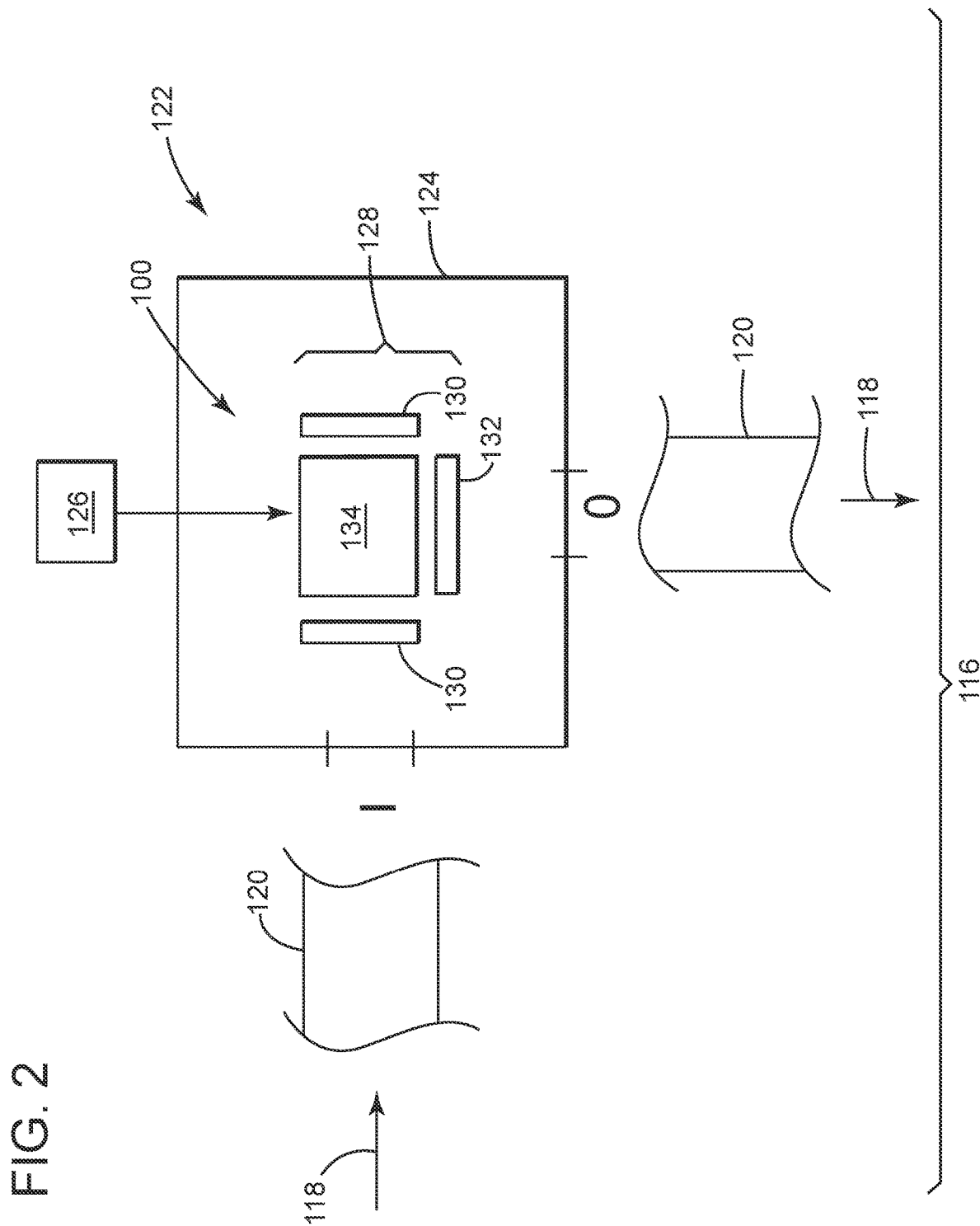
FIG. 2 depicts a schematic diagram of an example of the coated part of FIG. 1 as part of a flow control.

FIG. 2 depicts a schematic diagram of an example of the coated part 100 of FIG. 1. This example is found at a distribution network 116, typically designed to carry material 118 through a network of conduit 120. These designs may embody vast infrastructure of pipes or pipelines, with may connect to pumps, boilers, and the like, to that move process or working fluids, whether gases, liquids, solids, (or mixes of the same). The coated part 100 may be part of a flow control 122 that can regulate flow of the working fluid through these complex networks. This device may have a valve body 124, often made of cast or machined metals. This structure may form a flange at openings I, O. Adjacent pipes 120 may connect to these flanges to allow material 118 to flow through the valve body 124. An actuator 126 may connect to the valve body 124. The actuator 126 may use pneumatics or hydraulics to control movement of parts of the device. As shown, these parts may embody valve trim 128 that regulates flow of material 118. In one implementation, the valve trim 128 may include a cage 130 and a seat 132. A plug 134 is also shown in connection with the actuator 126.

The plug 134 may have a single piece or unitary construction that can accept a rugged conventional stem connection to the actuator 126. This unitary construction brings high strength, high reliability, and simplicity together. It also may perform better than other designs that are meant to compensate for use of brittle materials, like Inconel or high-strength steels, in highly erosive environments. These other designs may form the plug from multiple pieces with mechanical connections between them. The pieces may use materials that are different from one another. This features allows for specific materials to be "placed" or located in areas that best suited to withstand the working fluid. However, use of multiple pieces in aggregate can complicate manufacture of the plug and make it difficult to manage concentricity of the plug within specific tolerances. Further, these multi-piece plugs may deflect under load, which may cause it to jam and rapidly fracture because certain "guiding surfaces" deviate from center. Plug designs with multiple pieces or parts are also difficult to maintain in the field and rarely provide extended service life. The mechanical connections may make the plug unable to manage flow or pressure control because multiple pieces can come loose under heavy vibration loads consistent with many applications.

Figure 3:
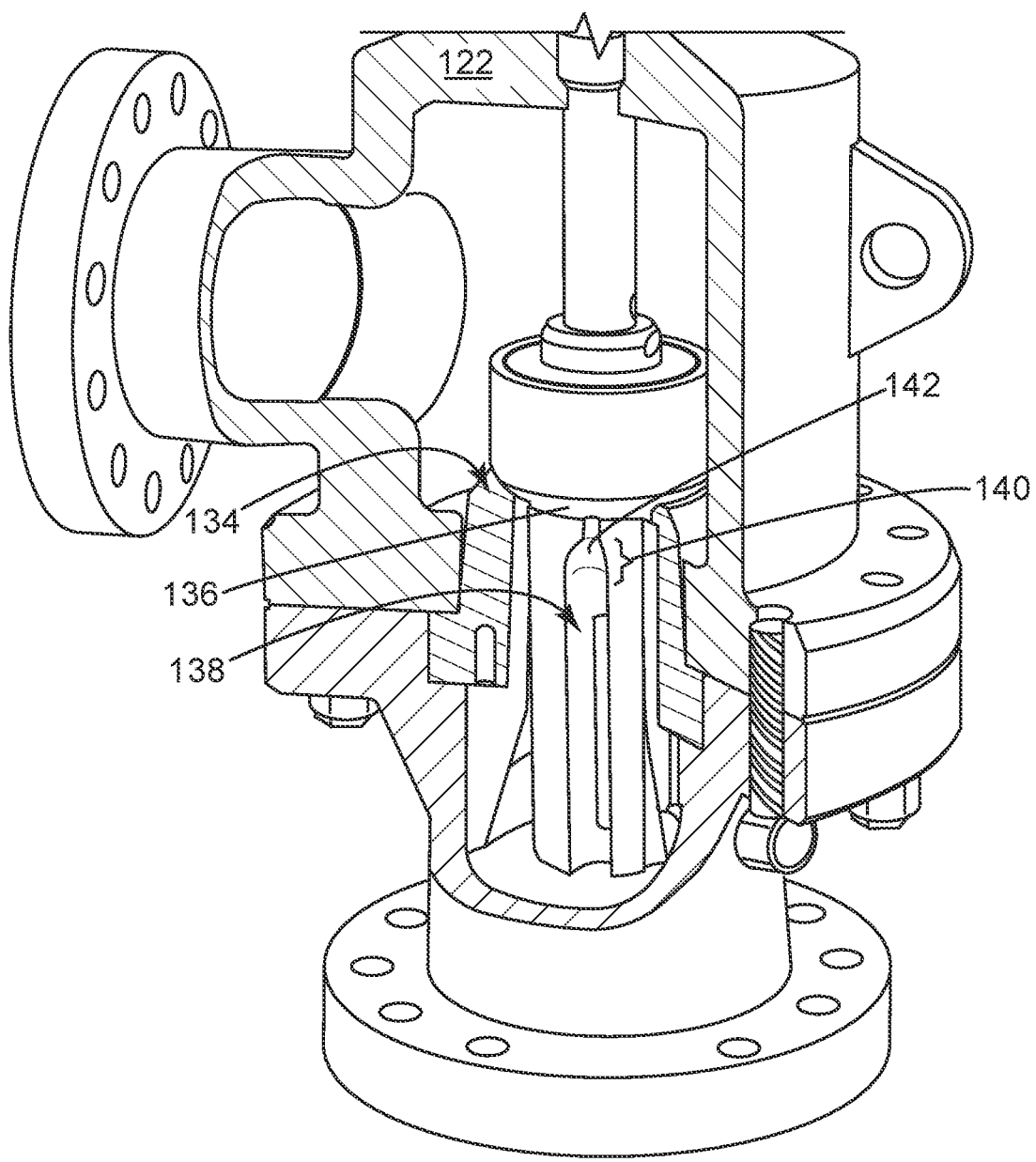
FIG. 3 depicts an elevation view of the cross-section of an example of the coated part of FIG. 2.

FIG. 3 depicts a perspective view with an example of the plug 134 of FIG. 2 as part of structure for the flow control 122 of FIG. 2, shown in partial cross-section. The plug 134 may include a body 136 with grooves 138 disposed about its circumference. The grooves 138 may extend along all or part of the length of the body 136. In one implementation, the grooves 138 have a depth that can change, preferably reducing at a tapered region 140, where the depth of the grooves 138 gradually dissipates or decreases to form a sloped or ramped surface 142. This "fluted" design is useful because the grooves 138 separate incoming high velocity flow of working fluid into individual streams. This feature equally disperses total fluid energy of the incoming flow across multiple flow streams. As an added benefit, the fluted design results in pressure loading that helps maintain trim stability in the flow control 122.

The fluted design dissipates energy of incoming flow of the working fluid as means to reduce erosive-forces. These designs, however, may prove more useful than designs with single or multiple "stages" that are meant reduce pressure along the length of the plug. Multiple stage designs use structure to sharply change direction of flow that can actually increase damage as high velocity process fluid "jets" impinge against any exposed surfaces. The stages may also induce cavitation as the process fluid undergoes high pressure drops at elevated temperatures, leading to further damage. Single stage designs, on the other hand, often do not have the flow geometry sufficient to balance incoming process fluid from the valve inlet to the trim opening. The resulting unbalanced fluid feed may cause the plug 134 to vibrate, which can also lead to damage and can negatively impact the underlying process.

Figure 4:
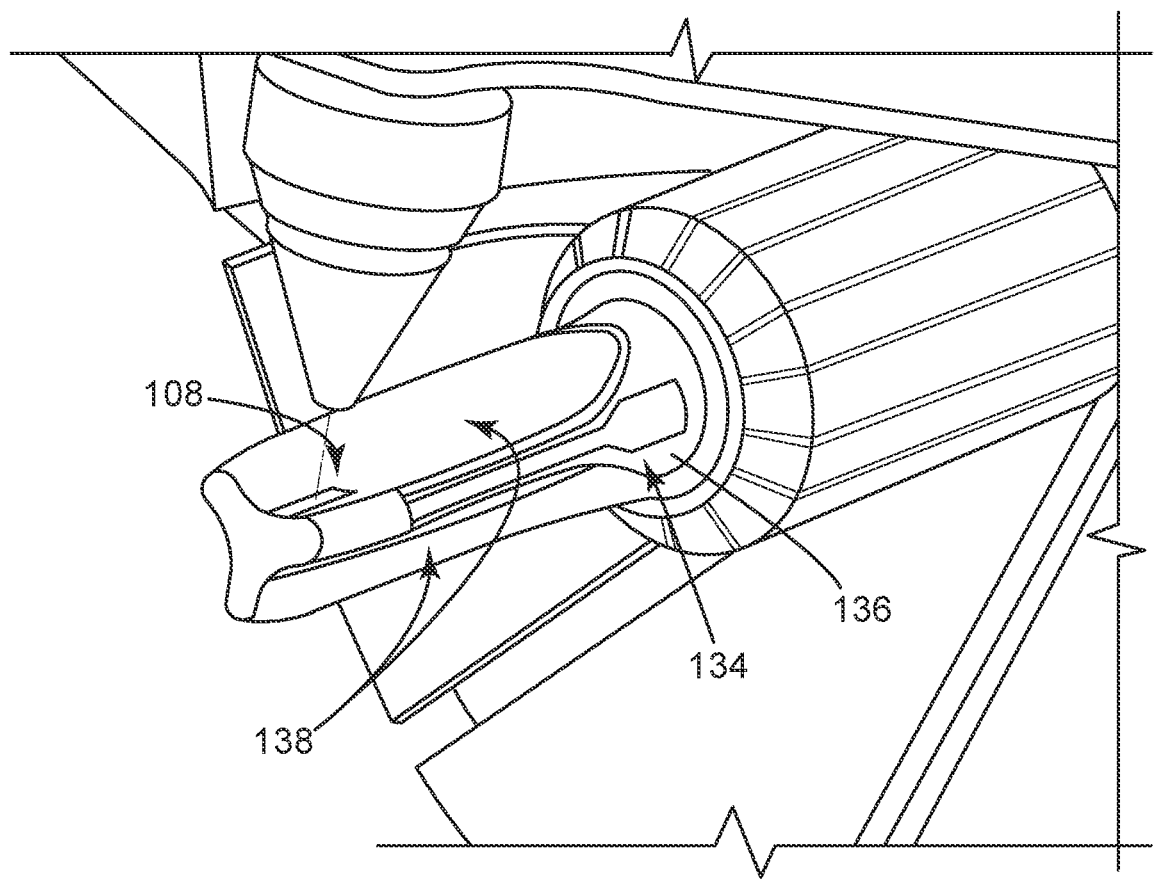
FIG. 4 depicts a perspective view of an example of the coated part of FIG. 1 during manufacture in an additive manufacturing process.

FIG. 4 depicts a diagram of an exemplary equipment to deposit the layered structure 108 (FIG. 1) onto the plug 134 of FIG. 3. This equipment may facilitate additive manufacturing processes. The technology may utilize a digitally driven CNC machine, like DED DMG Mori Hybrid machine, which allows for a layer-by-layer graded build-up of tungsten carbide nickel matrix in combination with a second material in different ratios. Adding boron or silicon into the nickel alloy may also work to lower melting point to facilitate the deposition process without the heat effect of the tungsten carbide material. The machine may provide laser-focused energy to fuse powdered metals to the distinctive geometry of the body 136. It may also result in a unique material matrix or structure that layers both the critical substrate and the hardened topcoat materials, creating a metallurgical bond that will not separate under thermal cycling. The layer structure 108 may comprise both the critical, Inconel substrate and the hardened topcoat materials. The process also forms a metallurgical bond between the layers that will not separate under thermal cycling. In one implementation, the process applies a tungsten-carbide hard coating (or "surfacing") on the outer surface of the plug 134 with no sacrifice in either metallurgy or complex fluted geometry.

Tungsten carbide is widely desired for its hardness. However, its brittle nature makes it unusable or unsuitable for some applications, particularly those that require superior core strength and ductility. The proposed method can transition materials from Inconel (at the body 136) to a specified concentration of tungsten-carbide at the outermost layer or surface of the layer structure 108 (FIG. 1) that interacts with the working fluid. In one implementation, the process may embed tungsten carbide in a nickel matrix to temper the negative characteristics of fusing tungsten carbide onto the body 136. The additive process may deposit the dual-alloy (e.g., tungsten carbide and nickel alloy) to precisely overlay the prescribed thickness consistently over the complex fluted geometry of the plug 134. This multi-layer grading process helps manage differential properties of the two materials.

In view of the foregoing, the improvements herein may benefit operators with valves and flow controls subject to harsh, erosive process fluids. These improvements may include a layer of graded and fused tungsten carbide/Inconel alloy, for example, with a depth of about 0.040-inch layer. This layer proved to perform equal to or better than other widely used tungsten carbide surface coatings, including high velocity oxygen fuel coating ("HVOF"), high velocity air fuel coating ("HVAF"), and spray-and-fuse cladding, particularly when considering loss of material and depth of application. The layer is superior to other conventional coating processes (as tested using industry standard ASTM G76 erosion test methods). Inferior coatings from HVOF and HVAF also flake or spall, leading to eventual exposure of the unprotected substrate, especially at 400° C. operating temperatures that are routinely encountered in these applications. These embodiments also show surface cracks under thermal cycling that did not propagate (as compared to layers formed by conventional overlay process). The surface cracks samples were likewise found to have benign impact with no additional loss of material when compared to the uncracked specimens (as subject to the ASTM G76 erosion test methods).

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A part for a flow control, comprising:
a body;
a coating disposed on the body, the coating having a composition with a material that has a concentration that changes from an innermost location proximate the body to an exposed surface of the coating,
wherein the composition comprises a nickel matrix deposited on the body using an additive manufacturing process.

2. The part of claim 1, wherein the concentration increases from the innermost location to the exposed surface.

3. The part of claim 1, wherein the concentration decreases from the innermost location to the exposed surface.

4. The part of claim 1, wherein the coating comprises successive layers in which the concentration decreases from an inner most layer to an outermost layer.

5. The part of claim 1, wherein the coating comprises successive layers in which the concentration increases from an innermost layer to an outermost layer.

6. The part of claim 1, wherein the material comprises tungsten carbide embedded in the nickel matrix.

7. The part of claim 1, wherein the body has longitudinal grooves forming a fluted design.

8. The part of claim 1, wherein the body has a central opening.

9. The part of claim 1, wherein the body forms a cylinder with a central opening disposed therethrough.

10. A valve, comprising:
a valve body;
a valve trim assembly comprising a part with a coating disposed thereon, the coating having a plurality of layers, including a first layer and a second layer that comprise a nickel matrix that is deposited on the part using an additive manufacturing process,
wherein the first layer and the second layer have a first material embedded in the nickel matrix in a first concentration and a second concentration, respectively, and
wherein the first concentration is different from the second concentration.

11. The valve of claim 10, wherein the first material is tungsten carbide.

12. The valve of claim 10, wherein the first material is a ceramic.

13. The valve of claim 10, wherein the part is a valve plug.

14. The valve of claim 10, wherein the part is a valve cage.

15. The valve of claim 10, wherein the part is a seat.

16. A kit, comprising:
a first valve part comprising a surface on which resides a coating, the coating comprising multiple layers, at least one layer having a composition of tungsten carbide embedded in a nickel matrix that is deposited using an additive manufacturing process,
wherein the tungsten carbide has a concentration that changes from a first location proximate the surface to an exposed surface on top of the multiple layers.

17. The kit of claim 16, wherein the concentration of tungsten carbide increases as between the first location and the exposed surface.

18. The kit of claim 16, wherein the concentration increases from at or about 0% at the first location.

19. The kit of claim 16, further comprising:
a buffer layer disposed between the surface of the first valve part and the coating.

20. The valve of claim 10, wherein the first layer and the second layer have a second material embedded in the nickel matrix selected from boron or silicon.

* * * * *